UNITED STATES PATENT OFFICE.

ROBERT WAHL, OF CHICAGO, ILLINOIS, ASSIGNOR TO WAHL-HENIUS RESEARCH LABORATORY, OF CHICAGO, ILLINOIS, A CORPORATION OF ILLINOIS.

DRY VEGETABLE FOOD PRODUCTS AND PROCESS OF PRODUCING THE SAME.

1,178,040. Specification of Letters Patent. Patented Apr. 4, 1916.

No Drawing. Application filed October 29, 1915. Serial No. 58,518.

*To all whom it may concern:*

Be it known that I, ROBERT WAHL, a citizen of the United States, residing at Chicago, in the county of Cook and State of Illinois, have invented new and useful Dry Vegetable Food Products and Process of Producing the Same, of which the following is a specification.

In my co-pending application, Serial No. 49681, filed September 9, 1915, I have described in considerable detail a method or process of rendering suitable for human food and for use in human food products, ungerminated vegetable substances containing translocation diastase and insoluble phosphates, carbohydrates, and proteids. More particularly, the said application dealt with the utilization of products containing or consisting largely of the aleurone layer of vegetable seeds. Briefly stated, the process of the said application consisted in mashing the said vegetable products under certain predetermined conditions of temperature and with or without the addition of gelatinized starch, whereby nutritive extracts whose exact character was dependent upon the particular steps and conditions of the process employed, were produced.

The present invention is dependent upon the digestive effects of the acid upon the proteids and phosphates of the raw material and the enzymatic action of the translocation diastase, in accordance with the principle set forth in the application above referred to. It is particularly concerned, however, with the production of a dry food product from the before-mentioned raw material, and still more particularly with the production of a torrified or caramelized product.

The preferred raw material for my present process is wheat-bran. Other raw materials which may be successfully used, however, comprise the class known as the aleurone layer of vegetable seeds and including, for instance, rye, bran, corn croppings as produced in hominy, corn-meal, other corn product industries, pearl barley croppings, that is, barley husks, to which the aleurone layer is attached, croppings of the oat-meal industries, and bean and pea croppings. All of these materials contain translocation diastase in quantities sufficient for their successful use, according to the present process, and in addition to this diastase contain varying quantities of carbohydrates, phosphates, proteids, peptones and other constituents, which, by the use of my process, are rendered soluble and assimilable.

In order that my invention may be more readily understood, I will describe in detail the manner of carrying out the same, using wheat-bran as the raw material.

My process consists in moistening the bran with water, preferably acidulated water, the amount of water used being approximately equal by weight to the mass of the material employed, adding a desired proportion of gelatinized starch, preferably in a dry condition, such as is obtainable, for instance, in the corn product known to the trade as mazam. This mixture of bran and gelatinized starch moistened with water, is maintained at a temperature favorable to the activity of the translocation diastase, such temperatures ranging approximately between 45 and 70° C., for a period of from thirty minutes to one hour, or thereabout. During this time the translocation diastase will act upon the gelatinized starch to convert the same into dextrin or maltose, or both, and simultaneously the lactic acid, which is developed through the growth of lactic acid bacteria at 40° to 55° C., will exert a digestive action upon the phosphates, converting the latter first into neutral phosphates and then into acid phosphates. When the action above described has been completed to the desired extent, the mixture is heated as rapidly as may be desired to a temperature of 80 to 200° C. and kept at about this temperature until the product has become dry. The result of this drying operation at the temperature specified will be to partially torrify or caramelize the dry product. The finished product will be found to have a pleasant flavor and aroma and is suitable for use as a substitute for kiln-dried, roast or caramel malt as a beer coloring or aromatic principle.

The process above described is susceptible of modifications to produce specifically different results, as may be desired. I prefer to use acidulated water in carrying out my process for the reason that the acid acts upon the otherwise insoluble tribasic phosphates to convert the same into neutral or acid phosphates and also exerts a proteolytic effect on the proteids, changing these to a considerable extent into peptone and amino bodies, thus enhancing the food value of the caramelized product. Products of considerable food value may thus be obtained either from bran alone or from bran together with gelatinized starch, for bran or the like products contain in themselves a considerable quantity of carbohydrates, either locked up in the integument of the aleurone layer or mechanically adhering thereto as a condition of imperfect milling. While any acid will have some effect in the direction mentioned, I prefer to employ lactic acid, preferably as produced according to a process described in my Letters Patent No. 1,028,508 of June 4, 1912. When this acid is employed the active lactic acid bacteria contained therein will propagate during the mashing period and will thereby produce more acid during the time of inversion. Far from interfering with the action of the diastase this acid (both the initial acid added and that developed during the process), exerts a stimulating effect upon the diastase by reason of the fact that acid becomes immediately neutralized and produces acid phosphates. It should be noted also that bran, or the like material, naturally contains lactic acid bacteria which are themselves propagated to form lactic acid during the inversion process.

As is pointed out in my co-pending application above referred to, it is possible to attain alone either one of the two desirable results reached in the preferred process disclosed. Thus, while the optimum inversion temperature of the translocation diastase is between 45 and 50° C., there may be some diastatic activity at much higher temperatures, i. e., above 60° C., while the acid-forming bacteria would not propagate at this temperature. By mashing with water and using such elevated temperatures therefor, it is possible to produce a dried product having a very high sugar content and substantially free of the acid-extracted substances. It is, of course, apparent that the largest proportion of gelatinized starch which can be successfully inverted by the translocation diastase, should be employed where it is desirable to produce a product of high sugar content. On the other hand, it is possible by heating to a sufficiently high temperature, for instance, 90° C., or thereabout, to effectively kill all diastatic enzyms in the mixture. If such procedure be adopted, and lactic acid or lactic acid bacteria, or both, be added, the digestive effects of the acid may be had, producing a soluble and assimilable product substantially free of sugar. By mashing the bran alone, without the addition of gelatinized starch, a digestible product having an exceedingly-low sugar content may, of course, be obtained, the amount of mechanically adhering or contained starch in the bran being appreciable but relatively small.

In following my preferred process it may be desirable after sufficient time has elapsed for the action of the lactic acid upon the material, to raise the temperature well above 55° C., say to 60° C. The further propagation of lactic acid will thereby be arrested and the mashing may be continued at such elevated temperature for a sufficient length of time to effect a thorough inversion of the starch by the continued action of the diastase.

While as before stated the drying temperatures used in my process are preferably high enough to partially torrify or caramelize the product, thus producing a substance suitable for replacing roast malt, roast corn, toasted corn-flakes, coffee, or other roasted or caramelized food products, lower temperatures may be employed whereby the caramelization will be less pronounced or entirely absent.

While in the foregoing specification I have particularly described what I consider to be the best method of carrying out my process, and have endeavored to analyze and ascertain the true character of the various re-actions which take place and the reasons therefor, I do not regard my invention as limited to the specific *modus operandi* mentioned, nor do I regard my invention as founded wholly upon the conclusions as to the nature of the changes taking place. On the other hand, the specific details of operation and the specifically described qualities of the resultant product, and my explanations of the reasons therefor, are to be regarded as illustrative only, and for the purpose of making my invention more clear, and are not to be construed as limitations thereof except in so far as I have included such limitations within the terms of the following claims, in which it is my intention to claim all novelty inherent in my process and in the product resultant therefrom as broadly as is possible in view of the prior art.

What I claim as new and desire to secure by Letters Patent is:—

1. The process which consists in moistening with water an ungerminated vegetable substance containing translocation diastase and starch, maintaining the moist material at a temperature favoring the activity of the said diastase for a time sufficient to permit of the inversion of the starch, and drying the resultant product.

2. The process which consists in moistening with water an ungerminated vegetable substance containing translocation diastase and starch, maintaining the moist material at a temperature favoring the activity of the said diastase for a time sufficient to permit of the inversion of the starch, and drying the said product at a temperature sufficient to caramelize the same.

3. The process which consists in moistening with water an ungerminated vegetable substance containing translocation diastase and water, maintaining the moist material at a temperature between 45 and 60° C. for a period of approximately one hour, and drying the resultant product at a temperature between 80 and 200° C.

4. The process which consists in subjecting an ungerminated vegetable substance containing insoluble phosphates to the action of lactic acid, and drying the resultant product.

5. The process which consists in moistening with acidulated water cereal matter of the character of bran, maintaining the moist material at a temperature between 45 and 60° C., and drying the resultant product.

6. The process which consists in moistening cereal matter of the character of bran with dilute lactic acid, maintaining the moist material at a temperature between 45 and 60° C. for a period of approximately one hour and drying the resultant product at a temperature sufficient to caramelize the same.

7. The process which consists in moistening a mixture of bran and starch with acidulated water, maintaining the moist material at a temperature between 45 and 60° C. for a period of approximately one hour, and drying the resultant product at a temperature sufficient to caramelize the same.

8. A dry product consisting of sugar and the lactic-acid-extracted substances of cereal matter of the character of bran.

9. A caramelized product consisting of sugar and the lactic-acid-extracted substances of cereal matter of the character of bran.

ROBERT WAHL.

In presence of—
  A. C. Fischer,
  K. O'Neill.